(12) United States Patent
Gouw et al.

(10) Patent No.: US 10,399,212 B2
(45) Date of Patent: Sep. 3, 2019

(54) FIXTURE ASSEMBLY FOR USE IN MAINTAINING HEAVY EQUIPMENT

(71) Applicant: GM Global Technology Operations LLC, Detroit, MI (US)

(72) Inventors: Gerritt Arie Gouw, Fowlerville, MI (US); James G. Hillaker, Columbiaville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 434 days.

(21) Appl. No.: 15/041,418

(22) Filed: Feb. 11, 2016

(65) Prior Publication Data
US 2017/0232581 A1 Aug. 17, 2017

(51) Int. Cl.
*B25B 11/00* (2006.01)
*B25J 19/00* (2006.01)

(52) U.S. Cl.
CPC .......... *B25B 11/00* (2013.01); *B25J 19/0066* (2013.01)

(58) Field of Classification Search
CPC .............................. B25B 11/00; B25J 19/0066
See application file for complete search history.

(56) References Cited

U.S. PATENT DOCUMENTS

| 7,000,290 B1* | 2/2006 | Ace | E05D 5/10 16/229 |
| 8,419,000 B2* | 4/2013 | St John | B25B 11/00 118/500 |
| 9,821,472 B2* | 11/2017 | Saadat | B25J 15/0028 |
| 2011/0168855 A1* | 7/2011 | Bonczyk | H01Q 1/1207 248/201 |

\* cited by examiner

*Primary Examiner* — Ryan J. Walters
(74) *Attorney, Agent, or Firm* — Reising Ethington P.C.

(57) ABSTRACT

A fixture assembly, for use in maintaining a piece of heavy equipment. The fixture assembly includes a first connecting component configured to be connected releasably to a first part of the heavy equipment, and a second connecting component configured to be connected releasably to a second part of the heavy equipment connected to the first part when the heavy equipment is assembled. The fixture assembly also includes a hinge arrangement connecting the first connecting component to the second connecting component. The technology further includes methods for maintaining the heavy equipment using the fixture assembly, such as by separating heavy equipment parts in order to replace a gearbox of the equipment.

13 Claims, 6 Drawing Sheets

FIXTURE ASSEMBLY FOR USE IN MAINTAINING HEAVY EQUIPMENT

TECHNICAL FIELD

The present disclosure relates generally to systems and methods for maintaining heavy equipment (repairing, inspecting, etc.) such as a large robot needing a new gearbox at a joint thereof.

BACKGROUND

This section provides background information related to the present disclosure which is not necessarily prior art.

Large or heavy robotics are used in many manufacturing processes including assembly of automobiles. These machines occasionally require maintenance, such as repair, inspection, or replacement of a gearboxes. Due to the configuration, including weight and weight distribution of such machines, these procedures can be very labor, resource, and time intensive.

Figure 1:
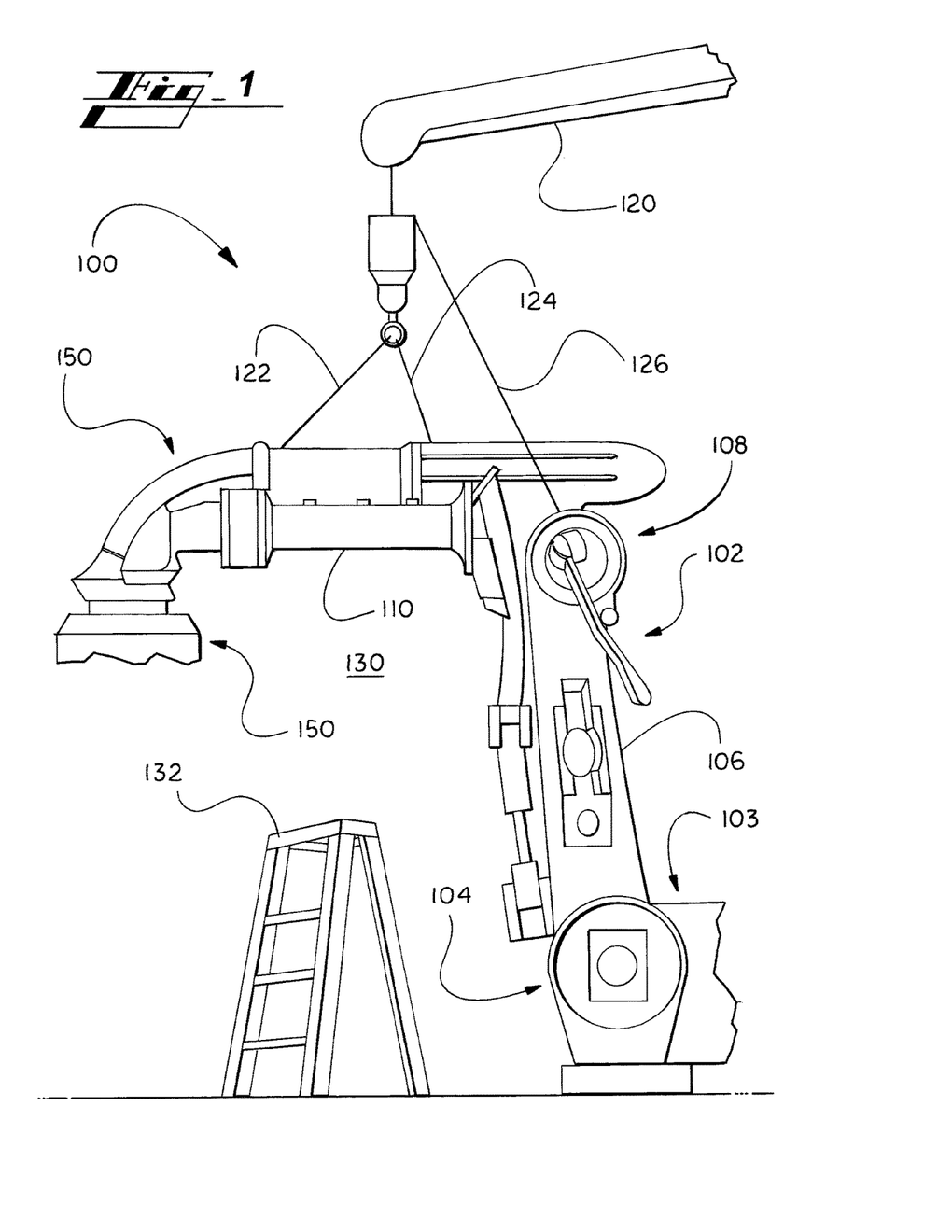
FIG. 1 illustrates features of a cumbersome method of changing a lower gearbox of an example heavy robot.

Turning to the figures and particularly the first figure, FIG. 1 shows an arrangement 100 arranged by the inventors for the present application. The arrangement 100 includes an example assembly robot 102, being a robot provided by the Fanuc America Corporation. The labor-, resource-, and time-intensive task of changing a gearbox of the robot 102 results from needed setup, use, and teardown of significant ancillary equipment.

The robot 102 can include a base 103, which acts as a counterweight, to forces from the mass and operation of the robot arms, for providing stability. The robot 102 includes a lower joint 104, which can be referred to as a second joint (which the inventors refer to as J2), connecting the base 103 to a first arm 106, which can be referred to as an axis 2 arm (which the inventors refer to as A2).

The first arm 106 connects at an upper joint 108, which can be referred to as a third joint (J3), to a second arm 110. The second arm 110 can be referred to as a third axis, or axis 3, arm (A3).

The robot 102 can be used with any of a wide variety of effectors, or connected items (or end effects) 150, depending on the type of work the robot 102 will be used for.

Example maintenance challenges include changing a gearbox disposed within the lower joint 104. In one method created by the inventors, a crane 120 is used to support parts of the robot 102 to facilitated changing the gearbox.

To change the gearbox using such a crane 120, a large amount of work, time, and space are needed. An existing manufacturing area or cell 130 must be arranged appropriately. Often, pre-existing parts of the cell 130 need to be torn down to create space for the crane 120. Over-head space must sometimes be made by moving existing ceiling structures. Millworkers or riggers need to run the crane 120 and rig it to the robot 102.

As shown, the crane 120 connects by support lines 122, 124 to the upper arm 110 of the robot 102. The crane 120 can also be connected to other parts of the robot 102, such as at or adjacent the upper joint 108, as shown by support line 126. Workers can use one or more lifts or ladders 132 in attaching the rigging and detaching the rigging after the gearbox change.

Once the setup is completed, two or more mechanics perform the gearbox change using the arrangement 100 established.

Further complicating this technique, separating the lower arm 106 at the lower joint 104 from the base 103 cannot generally be done with precision control, and calibration of the robot 102 is typically lost. Electricians and programmers are needed to recalibrate the robot 102 after the joint 104 is reassembled.

In some cases, the cell 130 must be replaced to its prior condition for the subject manufacturing process, requiring further work and time, and so cost. The entire process can require, for example, six or more hours, up to an entire shift of time, sufficient additional space, and multiple mechanics, multiple riggers or millworkers, an electrician, and a programmer.

SUMMARY

The present disclosure relates to systems and methods for changing parts of large robotics equipment.

In an embodiment described primarily herein, a gearbox of a lower joint of a heavy robot is changed using the novel system.

Other aspects of the present technology will be in part apparent and in part pointed out hereinafter.

The figures are not necessarily to scale and some features may be exaggerated or minimized, such as to show details of particular components.

In some instances, well-known components, systems, materials or methods have not been described in detail in order to avoid obscuring the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Specific structural and functional details disclosed herein are therefore not to be interpreted as limiting, but merely as a basis for the claims and as a representative basis for teaching one skilled in the art to employ the present disclosure.

I. INTRODUCTION

In various embodiments, the present disclosure describes systems and methods for repairing heavy equipment. More particularly, the disclosure relates to a fixture assembly for temporarily joining parts of heavy equipment such as a robot or other machinery to facilitate separation of the equipment parts.

The heavy-equipment parts are separated for purposes such as maintenance check, part replacement or other repair. In the example described primarily herein, the part being repaired is a gearbox of the heavy robot 102 described above and shown in FIG. 1.

The fixture assembly is configured to connect to respective parts of the heavy equipment and maintain a predetermined relative positioning between the parts while the parts are separated. For a task, such as gearbox replacement, using the assembly, equipment parts can in various embodiments be moved apart linearly and/or angularly with respect to each other. The robot parts can then be returned to their initial position by linear and/or angular movement with respect to each other. The movements can be accomplished with relative ease using the present fixture assembly.

Relative spacing of the equipment parts is maintained carefully in the movements. For instance, in various embodiments, the equipment parts are kept carefully at a constant elevation while they are moved apart, and then later back together.

The process of using the fixture assembly of the present disclosure has benefits including significant savings in labor, time, and space required to perform the maintenance or repair. Cost and time is also saved by the controlled manner by which the heavy-equipment parts can be moved apart and back together, which obviates equipment calibrating that would be required if the equipment parts were moved apart in a less-controlled manner, such as using the rigging of FIG. 1. Space is saved because arrangements such as the rigging system of FIG. 1 are not needed.

While the present technology is described primarily in connection with heavy robots, and more particularly the example robot shown in the figures, the technology is not limited by the focus.

In contemplated embodiments, the subject equipment includes a machine, apparatus, building structure, and/or another structure such as a static structure adjacent such machine or apparatus. One part of the fixture assembly can be configured and arranged to connect to a static or otherwise generally secure structure such as a wall, floor, or adjacent apparatus such as a secured cart, stand, pole, or other base.

The concepts can be extended to a wide variety of applications, such as to temporarily connect parts of other heavy equipment or machinery. The subject equipment or machinery can be configured for use in manufacturing automobile parts, for instance, or other products, such as parts of aircraft, marine craft, home or commercial appliances or structures, the like, and other.

II. ASSEMBLY COMPONENTS AND FUNCTION—FIGS. 2-6

Figure 2:
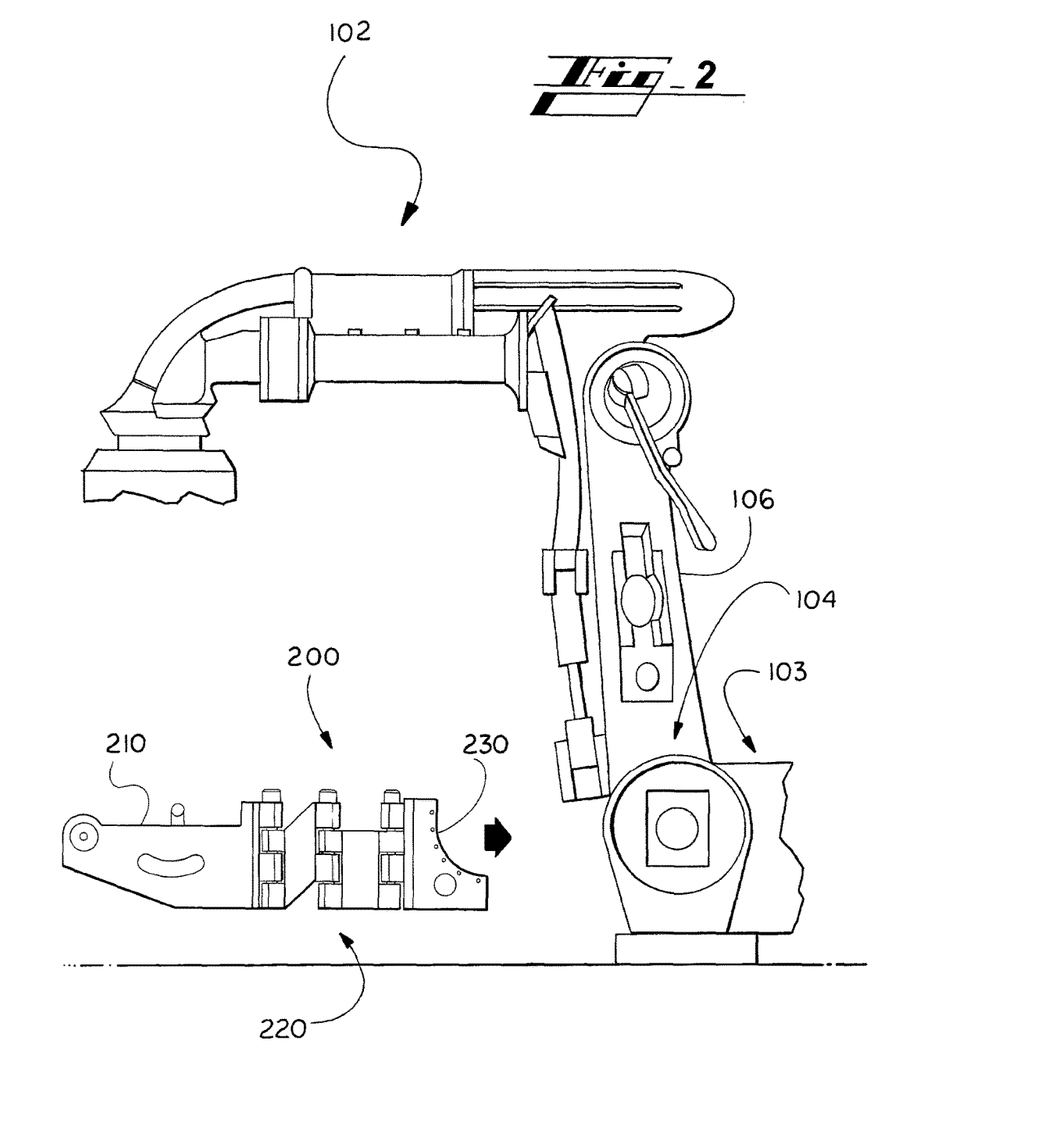
FIG. 2 illustrates a side view of an example fixture assembly for use in maintaining the example heavy robot, according to an embodiment of the present disclosure.

Turning again to the figures, FIG. 2 illustrates a side view of an example fixture assembly 200 and the example heavy robot 102.

The fixture assembly 200 includes three primary components: a first connecting component 210 joined by a hinge arrangement 220 to a second connecting component 230. Each of the connecting components 210, 230 can be referred to as a plate in association with configurations of the fixture assembly 200 in which it is shaped as a plate.

In various embodiments, at least one of the hinges of the hinge arrangement 220 is configured to be adjustable, or calibrated to ensure the connecting components 210, 230 are positioned and/or move with respect to each other as desired.

The first connecting component 210 is configured to connect to a first part of a piece of robot 102, and the second connecting component 230 is configured to connect to a second part of the robot 102. In the primary example described, the first connecting component 210 is configured to connect to a first part of the joint 104 of the robot 102, and the second connecting component 230 is configured to connect to a second part of the joint 104 of the robot 102. The first part and second part of the robot 102 are in some cases adjacent each other, in some cases connected to each other, and in some cases connected directly to each other.

Figure 3:
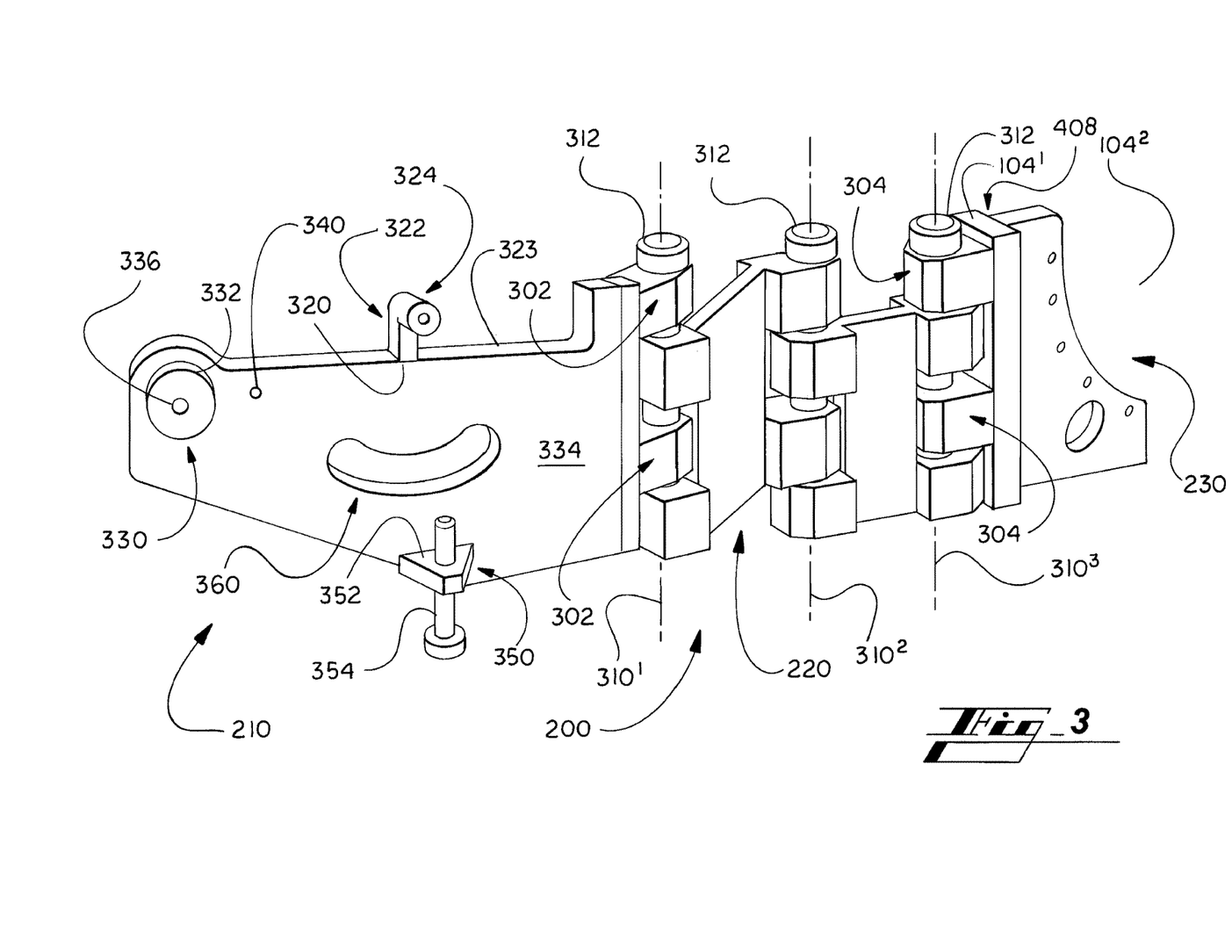
FIG. 3 illustrates the fixture assembly in more detail, partially connected to the robot.

FIG. 3 shows a perspective view of the fixture assembly 200 in more detail. The fixture assembly 200 is shown connected to the joint 104 of the robot 102. More particularly, the second connecting component 230 is connected to a first half $104^1$ of the joint 104.

The first connecting component 210 includes or is connected to a first hinge base 302, which can include one or more pieces and connects to a first end of the hinge arrangement 220. The second connecting component 230 includes or is connected to a second hinge base 304, which can include one or more pieces and connects to a second end of the hinge arrangement 220.

In various embodiments, the hinge arrangement 220 forms multiple axes 310. In the example of FIG. 3, the hinge arrangement 220 includes three pins 312 facilitating hinge movement about respective axes $310^1$, $310^2$, $310^3$.

Other number of pins 312, and other hinge arrangements can be used. While each pin 312 and axis 310 is shown disposed generally vertically, in contemplated embodiments (not shown in detail), the hinge arrangement 220 is configured so that one or more of axis 310 is disposed in another direction.

While the axes 310 in the illustrated example are generally parallel to each other, in contemplated embodiments, axes are not all parallel, allowing movement of the connecting components 210, 230 with respect to each other in more than one plane. Generally, the fixture assembly 200 is configured so that parts of a heavy machinery (e.g., sides of a robot joint, such as joint 104) can be moved in a predetermined manner from a starting position, for repair or maintenance of the robot 102, and then returned together by a corresponding pre-determined manner to the exact same original starting point.

Figure 6:
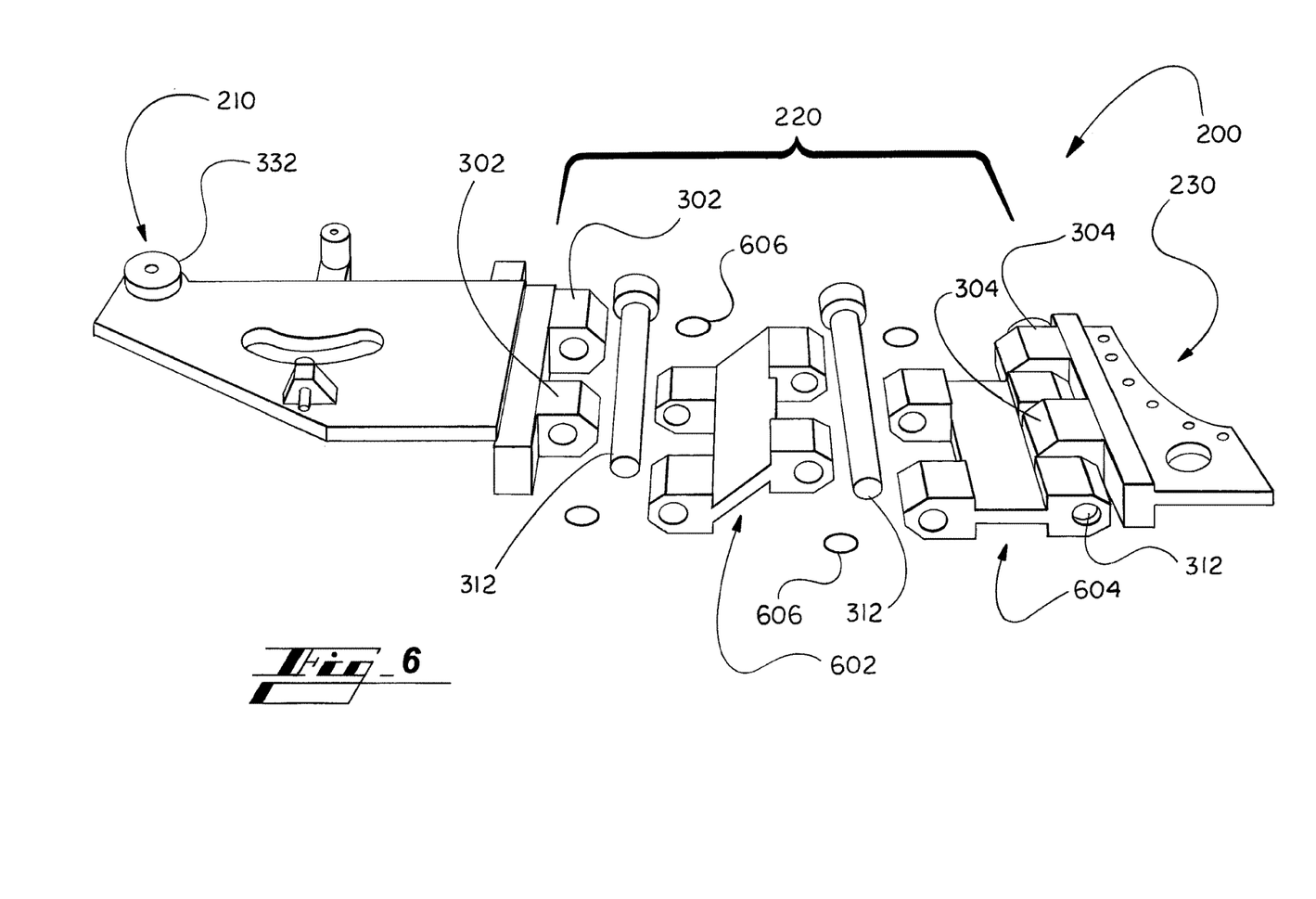
FIG. 6 illustrates a perspective view of the fixture assembly with the hinge arrangement partially disassembled to show some detail.

Turning briefly to the last figure, FIG. 6 illustrates a perspective view of the fixture assembly 200 with the hinge arrangement 220 partially disassembled to show arrangement detail. In the example, the illustrated hinge arrangement 220 includes three pins 312 and two hinge body parts 602, 604. The arrangement 220 also includes multiple bearings 606, each configured to be positioned around a hinge pin 312 and between adjacent hinge body parts 602, 604 or between a hinge body part 602, 604 and a hinge base 302, 304.

The multi-axes hinge arrangement 220 is configured to facilitate controlled and desired relative movement between the components of the joint 104 of the robot 102. By having multiple axes, the first and second connecting components 210, 230 of the fixture assembly 200 have more than one degree of freedom or motion with respect to each other when connected by the hinge arrangement 220. The first and second connecting components 210, 230 can be moved in more than one manner with respect to each other while the assembly 200 is connected rigidly to the components of the joint 104.

Flexibility afforded by a multi-axes hinge arrangement 220 is valuable in situations in which the parts of the heavy equipment cannot easily be simply swung away from each other on one axis, such as due to fit and space restrictions at and/or adjacent the subject parts $104^1$, $104^2$. If the parts can be simply swing away from each other, a multi-axes or single-axis version of the present fixture assembly 200 can be used. More than one degree of freedom can be useful when, for instance, fit and spacing for the robot 102 requires that the first part $104^1$, connected to the first connecting component 210 be first moved in one direction—e.g., along a first curved path, or first angular direction—using the hinge arrangement 220, and then along a second direction—e.g., along a second curved path, or second angular direction—using the hinge arrangement 220.

In some case, a first motion, such as the movement in the first direction, enables a subsequent motion, such as a lateral motion of one part $104^1$, $104^2$ relative to the other part $104^2$, $104^1$ creating space to then move the parts angularly with respect to each other. The first motion may allow one or more of the parts of the robot 102 to move away from each other in one way, to allow them to then be rotated in another way. The first motion could also allow one or more of the parts $104^1$, $104^2$ of the robot 102 to move past, around, or beyond other components of the robot 102 or other environmental items, such as end effects 150, adjacent the robot components being separated.

With continued reference to FIG. 3, the fixture assembly 200 includes multiple linking or aligning structures, such as the protrusion 324.

While the linking or alignment structures can be configured, arranged, and used for linking and/or aligning the fixture assembly 200 to the robot 102, the structures are described primarily hereinafter by the term linking structures for simplicity.

Each linking structure can serve the purpose of aligning the fixture assembly 200 in a pre-determined desired manner with respect to the robot 102 and/or the purpose of joining the fixture assembly 200 to the robot 102. In various embodiments, the fixture assembly 200, including each linking structure, is configured and arranged to connect with pre-existing structure of the robot 102. The linking structures can be configured and arranged to connect to structure of the robot 102 created initially for another purpose in manufacturing and/or operation of the robot 102. For instance, at least one void or depression may be formed in the robot 102 for use in a manufacturing process by which the robot 102 is made.

Figure 4:
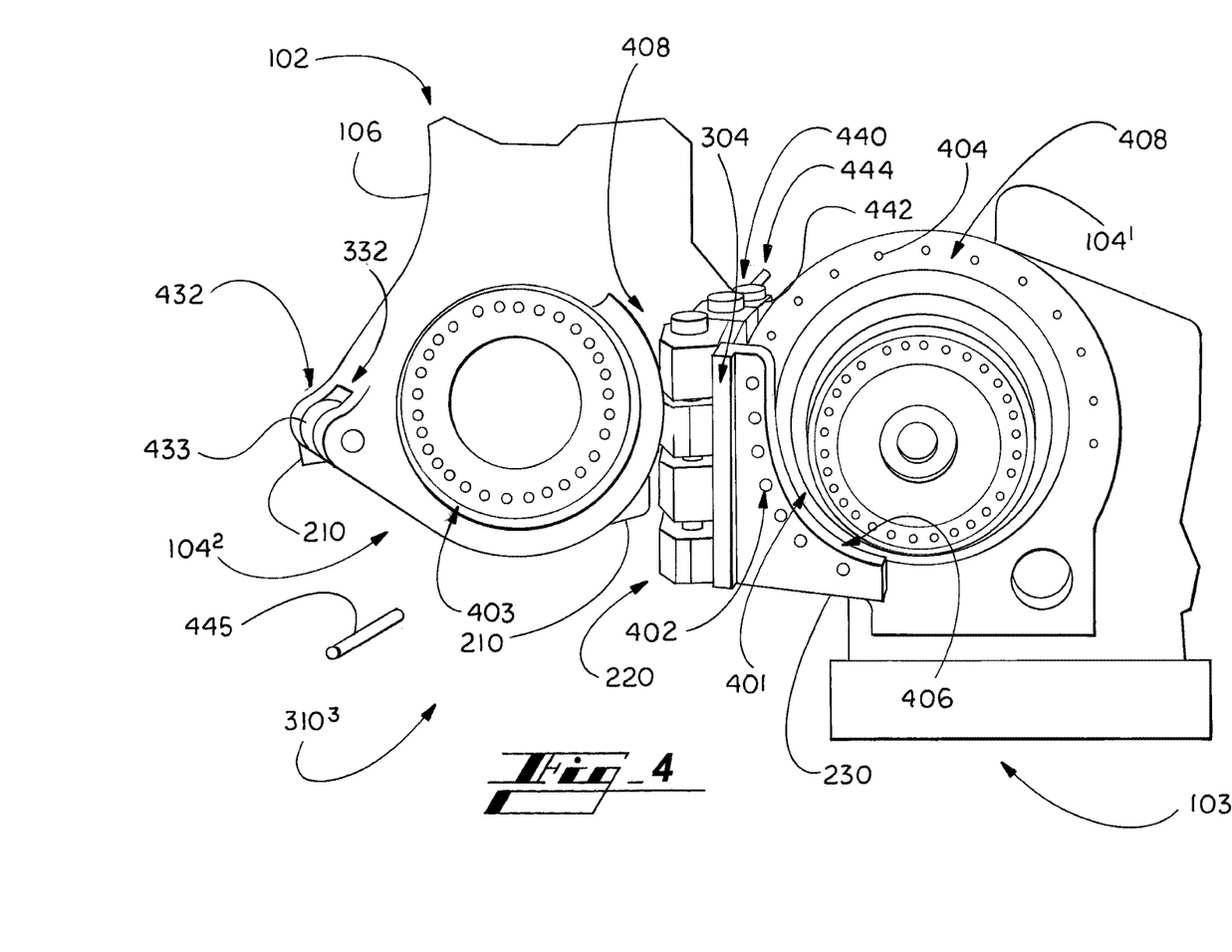
FIG. 4 illustrates a first view of the fixture assembly connected to both sides of a joint of the robot, after the fixture has been connected to the robot and the sides moved apart from each other.

Example voids in the robot 102 are the holes indicated by reference numeral 404 in FIG. 4. A designer of the fixture assembly 200, knowing the robot 102 will have the voids 404, can provide linking or alignment components (e.g., guide pin 445 and/or bolts shown at 402) configured and arranged to engage the voids 404, promoting connection and stabilization between the fixture assembly 200 and the robot 102 during use of the fixture assembly 200. The design in the illustrated embodiment includes the second connecting component 230 being configured and arranged with bolt holes 402, shown in FIG. 4 filled with bolts, for engaging the second connecting component 230 to the robot 102 via the holes 404 of the robot 102.

A first example linking structure is identified by reference numeral 320 in FIG. 3. In the embodiment illustrated, the first linking structure 320 includes an upright portion 322, extending above a top edge 323 of the first connecting component 210. From the upright portion 322 extends a protrusion 324. The first linking structure 320 is configured and arranged on the fixture assembly 200 so that the protrusion 324 interfaces with matching structure of the robot 102. The matching structure can be an opening or orifice 524, such as shown by way of example in FIG. 5.

In various contemplated embodiments (not shown in detail), the first linking structure 320, as can be the case for each linking structure, includes or is configured to receive joining structure, such as a bolt or screw, to connect the linking structure to the robot 102.

In one embodiment, one of the linking structures or part thereof, such as the protrusion 324, is connected to a mating structure of the robot 102, such as a hole, that has a different configuration before being mated with the linking structure. The hole of the robot 102 at numeral 524 can include, for instance, a grease orifice (or oil, air or other fluid vent) and be first covered, then unplugged to make room for mating the orifice with the protrusion 324.

A second example linking structure is identified by reference numeral 330 in FIG. 3. In the embodiment illustrated, the second linking structure 330 includes a protrusion 332, extending from a front surface 334 of the first connecting component 210. The second linking structure 330 is configured so that the protrusion 332 interfaces with a matching structure of the robot 102, such as the robot structure 432, including a hole 433, as shown in FIG. 4, configured and arranged to receive the protrusion 332. The connection involving the second example linking structure 330 is also shown, from the opposite view, in FIG. 5, whereat an opposite side of the component 210 is indicated by reference numeral 530.

With continued reference to FIG. 3, in some embodiments, the second linking structure 330 includes a hole or void 336 sized and shaped to receive a guide pin, screw, bolt, or other connector for connecting the first connecting component 210 to the robot 102.

A third example linking structure is identified by reference numeral 340 in FIG. 3. In the embodiment illustrated, the third linking structure 340 includes a hole or void 342. The hole 342 is sized and shaped to receive a screw, bolt, or other connector for connecting the first connecting component 210 to the robot 102. The connecting components 210, 230 can include additional such structures, configured and arranged as desired, such as at a location and with a size corresponding to pre-existing mating structure of the robot 102.

A fourth example linking structure is identified by reference numeral 350 in FIG. 3. In the embodiment illustrated, the fourth linking structure 350 includes a base 352 extending from a front surface 334 of the first connecting component 210. The base 352 includes an adjusting component 354. The adjusting component 354 can take any of a variety of forms. In the embodiment shown, the adjusting component 354 includes a threaded hole in the base 352 for receiving an adjustment bolt or screw illustrated. The arrangement can be referred to by names such as load bolt arrangement, outer hinge plate load bolt arrangement, the like or other. The adjusting component 354 can be adjusted, to engage the robot 102, the floor, or other reference structure, to ensure desired alignment of the heavy fixture assembly 200 with the robot 102 while the fixture assembly 200 is being connected to the robot 102. In some embodiments, after the fixture assembly 200 is connected as desired to the robot 102, the load bolt arrangement is adjusted to release its connection to the robot 102, floor, or other reference structure.

The fourth linking structure 350 is positioned during installation of the fixture assembly 200 so that a tip or bottom of the screw can interface with a part of the robot 102 or with an adjacent structure, such as a floor or cart. By adjusting the screw to interface with the robot part or adjacent structure, the user further secures the fixture assembly 200 in place with respect to the robot 102.

Figure 5:
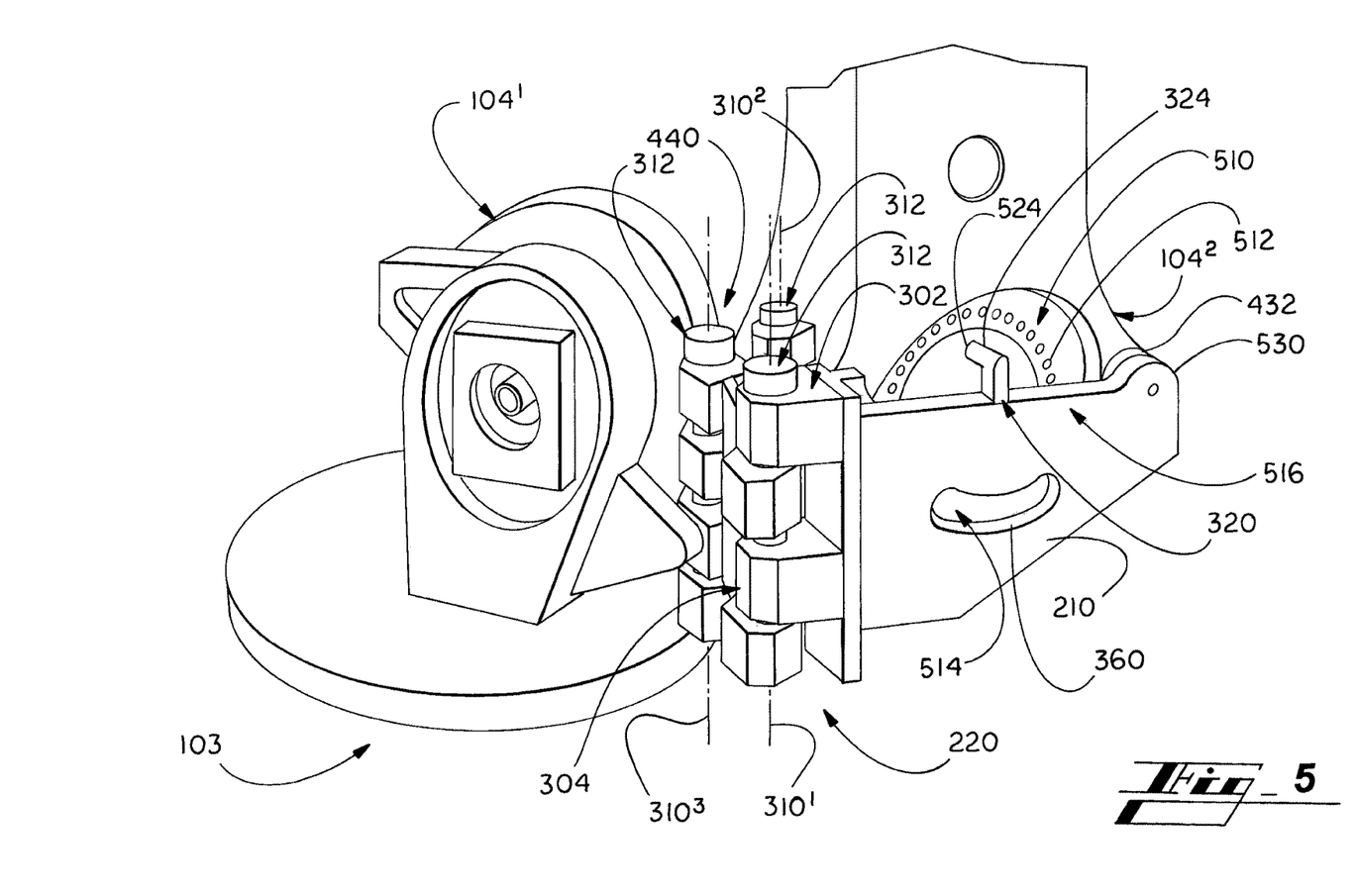
FIG. 5 illustrates an opposite view of the fixture assembly connected to the robot with the joint opened.

A fifth example linking structure is identified by reference numeral 440 in FIGS. 4 and 5. The structure 440 can be referred to in some embodiments as a jack bolt, jack-bolt structure, jack-bolt arrangement or the like. The structure 440 includes a base 442 comprising a threaded portion for receiving a threaded bolt 444. In various embodiments the linking structure 440 is configured so that, in connecting the fixture assembly 200 to the robot 102, the bolt 444 is adjusted until it contacts the second half $104^2$ of the joint 104 of the robot 102. The structure 440 thus disposed works to maintain some relative positioning between the fixture assembly 200 and the robot 102, by keeping the assembly 200 from moving further towards the point at which the bolt 444 contacts the robot 102.

In one embodiment, in installing the fixture assembly 200, an early step includes passing a guide structure 445, such as a pin or rod, through one of the holes (at 402 in FIG. 4, shown with bolts in them already) of the second connecting component 230 and a corresponding one of the holes 404 of the robot 102. The guide pin 445 and/or the assembly holes at numeral 402 are in some implementations considered linking structure, though the guide pin is not fixedly connected to a balance of the assembly 200. The guide pin 445 connects the assembly 200 and the robot 102 temporarily to facilitate establishing of a fuller connection between the fixture assembly 200 and robot 102. The guide pin 445 can, for instance, maintain some relative positioning of the fixture assembly 200 with the robot 102, to be later connected by the bolts at 402.

The fifth example linking structure 440 is in some implementations adjusted to secure the second connecting component 230 against the second half $104^2$ of the joint 104 after the guide pin 445 is installed. The guide pin 445 and fifth example linking structure 440 thus limit relative movement between the fixture assembly 200 and the robot 102—the guide pin 445 keeps the second connecting component 230 from moving vertically or laterally with respect to the second half $104^2$ of the joint 104, or in any linear direction in a plane, between vertical and lateral, and the fifth linking structure 440 keeps the second connecting component 230 from rotating in one direction about the guide pin. By limiting relative movement as such, the guide pin 445 and fifth linking structure 440 maintain a desired relative positioning between the fixture assembly 200 and robot 102 at which the second connecting component 230 can be connected—e.g., bolted—appropriately to the first half $104^1$ of the robot joint 104. The guide pin 445 is in some cases removed and replaced with a bolt, like those shown at 402 in FIG. 4.

With continued reference to FIG. 3, the fixture assembly 200 in various embodiments includes at least one peak-through or pass-through slot or opening 360. The opening 360 is configured and arranged to allow personnel or robotics installing the fixture assembly 200 to access pre-determined elements, including elements of the robot 102, on an opposite side of the fixture assembly 200. The opening 360 can be formed in the first connecting component 210, for instance. The fixture assembly 200 would otherwise block the pre-determined elements, making difficult or impossible access to the elements by the personnel or robotics. In a primary embodiment, the elements include features of the joint 104, such as connection structures 510 (FIG. 5), such as bolts or nuts, holding together sides $104^1$, $104^2$ of the joint 104 (FIGS. 4 and 5).

As provided, the fixture assembly 200 is shown connected to the robot 102 and, particularly, the second connecting component 230 of the assembly 200 is joined to the first half $104^1$ of the joint 104, adjacent the second half $104^2$. Elements of the second connecting component 230 and its connection to the robot 102 are described in more detail below in connection with FIG. 4.

In various embodiments, the robot 102 is arranged—e.g., positioned—in a pre-determined manner for use of the fixture assembly 200. The robot 102 being disposed in the pre-determined manner provides one or more benefits to the process. An example manner includes positioning one or more structures of the robot 102 so that mass or force vectors associated with the robot 102 are balanced as desired before and/or after the parts $104^1$, $104^2$ of the robot 102 are separated. A particular example manner includes positioning the second arm 110 (FIG. 1) at a pre-set angle, or within a pre-set angle range, with respect to the first arm 106, such as at or near 45 degrees. Such an angle in some implementations promotes balance between the arms 106, 110, on one side, and the base 103 on the other side in the process of separating the parts $104^1$, $104^2$ of the robot 102. The example manner can also include the first arm 106 being positioned generally vertically. The pre-set angle can be set based on factors such as configuration (size, shape, mass distribution) of the robot 102 and any end effects 150 (FIG. 1) that may be connected to the robot 102. Benefits of pre-aligning the robot 102 in a pre-determined manner includes limiting forces—e.g., stresses and strains—exerted on the subject joint 104 during the process of using the fixture assembly 200.

FIG. 4 illustrates a first view of the fixture assembly 200 connected to both sides $104^1$, $104^2$ of the joint 104 of the robot 102. The view shows the fixture assembly 200 connected to both sides $104^1$, $104^2$ after the fixture assembly 200 has been connected to the robot 102 and the sides $104^1$, $104^2$ moved apart from each other. The position(s) for the sides $104^1$, $104^2$ allowing easy maintenance of the joint 104—e.g., repair, part replacement, etc.—can be referred to as a maintenance or maintaining position(s).

With the sides $104^1$, $104^2$ separated, internal parts of the joint 104 are exposed. In the example illustrated, the internal parts include a gearbox 401 shown in FIG. 4. The gearbox 401 interfaces with a gear 403 in operation of the robot 102.

The second connecting component 230 is in various implementations configured to fit with pre-existing features of the robot 102. The component 230 includes, for instance, a curved edge 406, sized and shaped to fit within a space 408 between the first and second joint sides $104^1$, $104^2$. The space 408 is indicated in FIG. 3 and at two places in FIG. 4. In some cases, the robot 102 is configured to include the space 408 for use in manufacturing the robot 102.

Configuring the second connecting component 230 in these way allows personnel or robotics to attach the fixture assembly 200 to the robot 102 with relative ease, without need to change or retrofit the robot 102.

FIG. 5 illustrates an opposite view of the fixture assembly 200 connected to the robot 102. The illustration shows the joint 104 opened in a carefully controlled manner, according to the design of the assembly 200. The design in various embodiments is configured so that the sides $104^1$, $104^2$, can be separated and kept at the same vertical disposition—e.g., generally the same vertical height—in the separating, and eventual reconnecting, of the sides $104^1$, $104^2$. Relative movement between the sides $104^1$, $104^2$ can include linear movement and/or angular movement, all while staying in the same elevational or horizontal plane—i.e., not changing vertical height. The relative linear movement can be accomplished by translating one or both connecting components 210, 230 linearly with respect to the other, wherein structure around at least two of the hinge pins 312 rotates about the hinge pins 312—e.g., any of the hinge body parts 602, 604 (FIG. 6), the first hinge base 302, and the second hinge base 304 rotate about their respective hinge pins 312. For relative rotational movement between the sides $104^1$, $104^2$, structure around at least one of the hinge pins 312 rotates about the respective hinge pin(s) 312. The hinge arrangement 220 is also configured to allow simultaneous relative linear and rotational movement of the connecting components 210, 230.

In various embodiments, one or more other pre-determined planes (linear or angular) or other dimensions of movement are maintained while one or more predetermined planes or other dimensions of movement are changed. In this way, connected parts of the robot 102, such as sides $104^1$, $104^2$ of the joint 104, can be moved in a pre-determined manner—i.e., in a carefully controlled manner from a starting position, for maintenance of the robot 102, and then returned, in a corresponding carefully controlled manner, back together at generally the same initial position.

As mentioned, in various embodiments, the predetermined manner of movement of the parts $104^1$, $104^2$ of the joint 104 or other robot part can include a predetermined relative motion. In various embodiments, the predetermined manner of movement of the parts of the joint or other robot part can include a predetermined motion of one or both parts of the robot.

In various embodiments, the predetermined manner of movement of the parts of the joint or other robot part includes movement in more than one direction. For instance, for embodiments of the fixture assembly 200 having two or more hinge pins or joints 312, the sides $104^1$, $104^2$ can be moved apart in multiple ways—e.g., (1) first moved linearly apart a bit, then rotated some with respect to each other, then moved linearly and angularly apart, (2) first moved linearly apart a bit, then rotated some with respect to each other, then moved linearly apart some more, then angularly apart, or (3) other, etc.

Depending on the configuration of a subject robot 102 and the configuration and arrangement of the fixture assembly 200, when the fixture assembly 200 is positioned on the sides $104^1$, $104^2$ of the joint 104, some of the connection structures 510 are accessible, by robot 102 or personnel without the robot needing to be disassembled or otherwise retrofitted or changed. An example is the upper connection structures 512 shown in FIG. 5, which can be accessed by robot 102 or personnel without need for a pass-through opening 360 (FIGS. 3 and 5), while other connection structures 514, 516 are not easily accessible. The pass-through opening 360 is configured and arranged to enable access by personnel and robotics to the structures 514 that are otherwise partially or fully hidden by the fixture assembly 200.

The connection structures 510 (512, 514, 516) are pre-existing features of the robot 102, such as bolt holes used in manufacture of the robot 102. In one embodiment, joint sides $104^1$, $104^2$ are held together by bolts at 510 until removed.

In one embodiment, for ensuring exact alignment between the sides $104^1$, $104^2$, in attaching the present fixture assembly 200 to the robot 102, only some of the robot bolts are removed initially, with others removed later, after the fixture assembly 200 is connected to the robot 102. The bolts at 516 are removed first, for example, then the first connecting component 210 connected to the joint 104. The other bolts, at 512, 514 are removed, then, after the first connecting component 210 is connected to the joint 104.

The robot 102 in some implementations includes corresponding alignment markings on the two parts $104^1$, $104^2$ to indicate the when the two parts are aligned, which can be referred to as the initial or home disposition. The parts $104^1$, $104^2$ are initially positioned so that the markings are aligned. The parts are separated from that position in the carefully controlled manner described to allow maintenance of the robot 102. The parts $104^1$, $104^2$ are then returned to the initial position in the carefully controlled manner, so that the markings align again. By the controlled manners, whether the markings are present, the robot 102 is returned to essentially the exact same initial or home disposition. As provided, additional work, time and personnel for calibrating the robot 102 is obviated by using the present technology, carefully separating the robot 102 from the initial position and carefully returning of the robot 102 to the initial position using the fixture assembly 200.

III. SELECT BENEFITS OF THE PRESENT TECHNOLOGY

Many of the benefits and advantages of the present technology are described above. The present section restates some of those and references some others. The benefits described are not exhaustive of the benefits of the present technology.

Fixture assemblies configured according to the present technology allow personnel and/or robotics to, in a highly controlled manner, separate parts of heavy machinery from an initial position to a separated position, for maintenance of the machinery, and then back to the exact same initial position.

The heavy-equipment parts are separated for purposes such as maintenance check, or part replacement or repair. In the example described primarily herein the part being checked or repaired is a gearbox of the heavy robot.

The process of using the fixture assembly of the present disclosure has benefits including significant savings in labor, time, materials, and space required to perform the maintenance or repair. These savings result from the relatively easy manner by which the heavy equipment can be maintained using the fixture assembly.

Cost and time is saved by limiting or eliminating heavy-equipment calibration, which would otherwise be needed, such as if the equipment parts were moved apart in a less-controlled manner, such as by using the rigging of FIG. 1.

Materials and space are saved because, for instance, the rigging system of FIG. 1, or the like, are not needed. Relatively little work is needed because space for such a rigging system does not need to be arranged (e.g., cell teardown), setup of such a rigging system is not needed, and a cell or area of the robot does not need to be returned to an initial condition.

While the present technology is described primarily herein in connection with heavy robots, and more particularly the example heavy robot shown in the figures, the technology is not limited by the focus. The concepts can be extended to a wide variety of applications, such as to temporarily connect parts of other heavy equipment or machinery. The subject equipment or machinery can be used in manufacturing automobile parts, for instance, or other products, such as parts of aircraft, marine craft, home or commercial structures or appliances, the like, and other.

While the figures show primarily the fixture assembly being used for maintaining a gearbox of a robot, the assembly can be used for other purposes.

Generally, the fixture is used to separate, from an initial position, parts of heavy equipment in a carefully controlled manner, using relatively little work and time, so that the parts can be returned to the exact same initial position, again with relatively little work and time.

Regarding time savings, in some cases time required to change a heavy robot gearbox was reduced from about five (5) or more hours, to change a gearbox using the system of FIG. 1, to about one-and-a-half (1½) hours, and in some cases to an hour or less.

Regarding personnel resources, in some cases, a need of two (2) mechanics, two (2) riggers, one (1) electrician, and one (1) programmer, for recalibrating, to change a gearbox using the system of FIG. 1, was reduced to two (2) mechanics.

IV. CONCLUSION

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A fixture assembly, comprising:
a first connecting component comprising:
a first plate connected releasably to a first part of a joint assembly of a piece of heavy equipment, the first plate having a hinge base disposed on an end thereof;
a second connecting component comprising:
a second plate connected releasably to a second part of the joint assembly of the piece of heavy equipment, wherein the first part of the joint assembly is assembled with the second part of the joint assembly to form a joint of the piece of heavy equipment, the second plate having a hinge base disposed on an end thereof; and
a multi-axis hinge arrangement connecting the first connecting component to the second connecting component, the hinge arrangement comprising a first hinge body part and a second hinge body part, the first hinge body part being hinged to the hinge base of the first plate by a first hinge pin that runs alongside a full length of the end of the first plate to establish a first hinge axis, the second hinge body part being hinged to the hinge base of the second plate by a second hinge pin that runs alongside a full length of the end of the second plate to establish a second hinge axis, wherein the first hinge body part and the second hinge body part are hinged together by a third hinge pin that establishes a third hinge axis, and wherein the first hinge pin extends fully through the hinge base of the first plate along the first hinge axis and the second hinge pin extends fully through the hinge base of the second plate along the second hinge axis.

2. The fixture assembly of claim 1, wherein the hinge arrangement is configured so that, once the first plate and the second plate are connected to the first part of the joint assembly and second part of the joint assembly respectively, the first part of the joint assembly can, while connected to the first plate component, be moved, from an initial position, and in a controlled manner limited by configuration of the hinge arrangement, to a maintenance position where the first part of the joint assembly is spaced apart from the second part of the joint assembly.

3. The fixture assembly of claim 2, wherein the hinge arrangement is configured so that the controlled manner comprises both relative linear motion between the first part of the joint assembly and the second part of the joint assembly and relative rotational motion between the first part of the joint assembly and the second part of the joint assembly while the first part of the joint assembly and the second part of the joint assembly are connected to the first plate and the second plate respectively.

4. The fixture assembly of claim 2, wherein the hinge arrangement is configured so that, by the controlled manner, a vertical disposition of the first part of the joint assembly and the second part of the joint assembly, while connected to the first plate and the second plate, respectively, remains substantially unchanged.

5. The fixture assembly of claim 2, wherein the controlled manner is a first controlled manner and the hinge arrangement is configured so that, after the first part of the joint assembly and the second part of the joint assembly are separated, the first part of the joint assembly can be, while connected to the first plate, moved from the maintenance position, and in a second controlled manner limited by configuration of the hinge arrangement, to the initial position where the first part of the joint assembly is adjacent the second part of the joint assembly.

6. The fixture assembly of claim 5, wherein the hinge arrangement is configured so that the second controlled manner comprises both relative linear motion between the first part of the joint assembly and the second part of the joint assembly, and relative rotational motion between the first part of the joint assembly and the second part of the joint assembly, while the first part of the joint assembly and the second part of the joint assembly remain connected to the first plate and the second plate, respectively.

7. The fixture assembly of claim 1, wherein the first connecting component comprises a linking structure configured and arranged in the first connecting component to, in operation of the fixture assembly, interface with a pre-existing mating structure of the first part of the joint assembly.

8. The fixture assembly of claim 7, wherein the linking structure comprises a protrusion configured and arranged to, in operation of the fixture assembly, be received by a receptacle of the pre-existing mating structure of the first part of the joint assembly.

9. The fixture assembly of claim 7, wherein the linking structure comprises a first protrusion and a second protrusion configured and arranged to, in operation of the fixture assembly, be received by a first receptacle of the pre-existing mating structure and a second receptacle of the pre-existing mating structure, respectively.

10. The fixture assembly of claim 7, wherein the linking structure includes a guide pin configured to be, during use of the fixture assembly, disposed through a fixture-assembly hole of the second connecting component and a corresponding equipment hole of the second part of the joint assembly to limit relative linear motion between the second connecting component and the second part of the joint assembly.

11. The fixture assembly of claim 10, wherein the second connecting component comprises a jack-bolt alignment structure comprising a threaded portion for receiving a threaded bolt, wherein the jack-bolt alignment structure is configured and arranged so that an end of the threaded bolt can, in operation of the fixture assembly, be positioned to contact the second part of the joint assembly to limit relative rotational motion, about the guide pin, between the second connecting component and the second part of the joint assembly.

12. The fixture assembly of claim 1, wherein the first connecting component comprises a load-bolt alignment structure comprising a threaded portion for receiving a threaded bolt, the load-bolt alignment structure being arranged to keep the first connecting component from being lowered below a minimum vertical position controlled by length and position of the threaded bolt.

13. The fixture assembly of claim 1, wherein the first connecting component comprises a pass-through opening configured and arranged to allow personnel or robotics, installing the fixture assembly onto the piece of heavy equipment, to access elements of the joint assembly that would otherwise be blocked by the first connecting component.

* * * * *